United States Patent
Levy et al.

(10) Patent No.: US 10,152,889 B2
(45) Date of Patent: Dec. 11, 2018

(54) PREDICTING THAT A PARKING SPACE IS ABOUT TO BE VACATED

(71) Applicant: ANAGOG LTD., Ramat Gan (IL)

(72) Inventors: Gil Levy, Tel Aviv (IL); Yaron Aizenbud, Haifa (IL)

(73) Assignee: ANAGOG LTD., Ramat Gan (IL)

( * ) Notice: Subject to any disclaimer, the term of this patent is extended or adjusted under 35 U.S.C. 154(b) by 0 days.

(21) Appl. No.: 15/492,645

(22) Filed: Apr. 20, 2017

(65) Prior Publication Data
US 2017/0243487 A1    Aug. 24, 2017

Related U.S. Application Data

(62) Division of application No. 13/979,397, filed as application No. PCT/IB2012/050013 on Jan. 2, 2012.

(60) Provisional application No. 61/432,625, filed on Jan. 14, 2011.

(51) Int. Cl.
| | |
|---|---|
| G08G 1/14 | (2006.01) |
| G07B 15/02 | (2011.01) |
| H04W 4/02 | (2018.01) |
| G08G 1/01 | (2006.01) |
| G01S 19/49 | (2010.01) |

(52) U.S. Cl.
CPC .............. *G08G 1/144* (2013.01); *G01S 19/49* (2013.01); *G07B 15/02* (2013.01); *G08G 1/012* (2013.01); *G08G 1/0141* (2013.01); *H04W 4/023* (2013.01)

(58) Field of Classification Search
CPC .................................................... G08G 1/144
See application file for complete search history.

(56) References Cited

U.S. PATENT DOCUMENTS

| | | | | |
|---|---|---|---|---|
| 7,847,709 | B2 * | 12/2010 | McCall ................. | G08G 1/005 340/426.13 |
| 2002/0022979 | A1 * | 2/2002 | Whipp .................. | G06Q 10/02 705/5 |
| 2003/0162536 | A1 | 8/2003 | Panico | |
| 2005/0280555 | A1 * | 12/2005 | Warner, IV ............. | G08G 1/14 340/932.2 |
| 2009/0281725 | A1 | 11/2009 | Sakata | |
| 2009/0309759 | A1 | 12/2009 | Williams | |
| 2010/0204877 | A1 | 8/2010 | Schwartz | |
| 2010/0302068 | A1 * | 12/2010 | Bandukwala ......... | H04W 4/046 340/932.2 |
| 2011/0022427 | A1 * | 1/2011 | Dayan ................... | G06Q 10/02 705/5 |
| 2011/0117933 | A1 * | 5/2011 | Andersson ......... | G01C 21/3626 455/456.2 |
| 2011/0153208 | A1 * | 6/2011 | Kruglick ............... | G01C 21/20 701/533 |

FOREIGN PATENT DOCUMENTS

| | | |
|---|---|---|
| WO | 2009/125350 | 10/2009 |

\* cited by examiner

*Primary Examiner* — Joseph H Feild
*Assistant Examiner* — Pameshanand Mahase
(74) *Attorney, Agent, or Firm* — Tutunjian & Bitetto, P.C.

(57) ABSTRACT

A method implementable in a mobile device includes determining a driving or walking motion state of the mobile device associated with a user from at least a motion type of sensor on the mobile device and storing a parking location for a vehicle associated with the mobile device, received from a location type of sensor on the mobile device, when the mobile device changes from a driving state to a walking state.

27 Claims, 3 Drawing Sheets

US 10,152,889 B2

PREDICTING THAT A PARKING SPACE IS ABOUT TO BE VACATED

CROSS-REFERENCE TO RELATED APPLICATIONS

This application is a Divisional of co-pending U.S. Ser. No. 13/979,397 filed on Jul. 12, 2013, which claims priority from U.S. Provisional Patent Application No. 61/432,625, filed Jan. 14, 2011, which is hereby incorporated in its entirety by reference.

FIELD OF THE INVENTION

The present invention relates to parking systems generally.

BACKGROUND OF THE INVENTION

PCT Publication WO 2009/125350 to Levy et al. describes a mobile communications device which includes a locator unit to receive and process information regarding a current location for the mobile communications device, a parking status determination unit to determine a parking status for the device based on at least changes in the current location, and a communication unit to forward the parking status to a parking community processor.

SUMMARY OF THE PRESENT INVENTION

There is therefore provided, in accordance with a preferred embodiment of the present invention, a method implementable in a mobile device. The method includes determining a driving or walking motion state of the mobile device associated with a user from at least a motion type of sensor on the mobile device and storing a parking location for a vehicle associated with the mobile device, received from a location type of sensor on the mobile device, when the mobile device changes from a driving state to a walking state.

Additionally, in accordance with a preferred embodiment of the present invention, the method includes detecting an approach event indicating that the mobile device is heading back to the parking location and transmitting a "returning to parking spot" indicator to a parking system upon the detecting.

Moreover, in accordance with a preferred embodiment of the present invention, the motion type of sensor can be at least one accelerometer or the combination of a low accuracy continually active, sensor to provide a preliminary motion state and a high accuracy sensor, activated for a short period of time, to provide a definitive motion state.

Further, in accordance with a preferred embodiment of the present invention, the location type of sensor is a GPS (global positioning system) sensor.

Alternatively, in accordance with a preferred embodiment of the present invention, the motion sensor is a low accuracy sensor and the location sensor is a high accuracy sensor.

Moreover, in accordance with a preferred embodiment of the present invention, the detecting includes determining when a distance from the parking location is reducing and when the distance is within a predetermined proximity.

Alternatively, in accordance with a preferred embodiment of the present invention, the motion sensor is a low accuracy sensor to provide an initial driving estimate and a high accuracy sensor to provide a final driving state decision.

Further, in accordance with a preferred embodiment of the present invention, the method includes identifying when the device is picked up by a user of the device and using the identifying to move the mobile device into a maybe parked state.

Still further, in accordance with a preferred embodiment of the present invention, the identifying includes sensing when a 3D position of the device has changed significantly.

Moreover, in accordance with a preferred embodiment of the present invention, the method also includes declaring the parked state for the vehicle once a walking state for the device has been declared.

Further, in accordance with a preferred embodiment of the present invention, the method also includes counting steps of the user in the walking state and determining the parked location of the vehicle using information about the steps.

There is also provided, in accordance with a preferred embodiment of the present invention, a method implementable in a computing device. The method includes receiving information regarding a first person's movements towards a parked car and providing to at least one second user an indication that the car of the first person is about to vacate a parking spot close to the current location of the at least one second user.

Further, in accordance with a preferred embodiment of the present invention, the providing includes finding members of a community which are driving in an area close to the parking spot.

Still further, in accordance with a preferred embodiment of the present invention, the providing includes reducing the number of members found in the step of finding to a minimum number.

Additionally, in accordance with a preferred embodiment of the present invention, the method also includes enabling the second user to reserve a spot about to be vacated by the first user.

Finally, in accordance with a preferred embodiment of the present invention, the method also includes enabling payment by the second user to the first user for the spot.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate,

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The device described in PCT Publication WO 2009/125350 to Levy et al. processes data from a locator unit of some kind (a GPS, mobile base station signal, compass, or accelerometer). However, Applicants have realized that a locator unit is unnecessary for most of the processing which the device needs to do and is only necessary to determine the actual parking spot. Applicants have realized that most of the processing concerns determining the motion state (parking, driving, walking, moving, etc.) of the user, which, since the person is in motion, the current location is of less interest. Therefore, Applicants have realized that, when the user is in motion, the device needs only to know the motion state, which may be determined from accelerometers, typically present on mobile devices, which use relatively little battery power. Moreover, Applicants have realized that, only when the user becomes parked does the device need to determine the current location. Thus, in the present invention, the device may take two inputs, one from a set of accelerometers (set of acceleration and orientation sensors), for the motion information, and one from a GPS, for the parking location. The latter may utilize more battery power but is only required at the time of parking.

Applicants have also realized that knowing that a car is about to vacate a parking space is highly valuable for car drivers searching for parking. Moreover, Applicants have realized that knowing that a person is heading toward their car gives advanced knowledge that a parking spot is about to be vacated. That advanced knowledge may be provided to drivers to enable them to drive directly to the about to be vacated spot, thus reducing their time, money and gas searching for a spot. Moreover, having this information for both parking lots and on street parking is invaluable.

Figure 1:
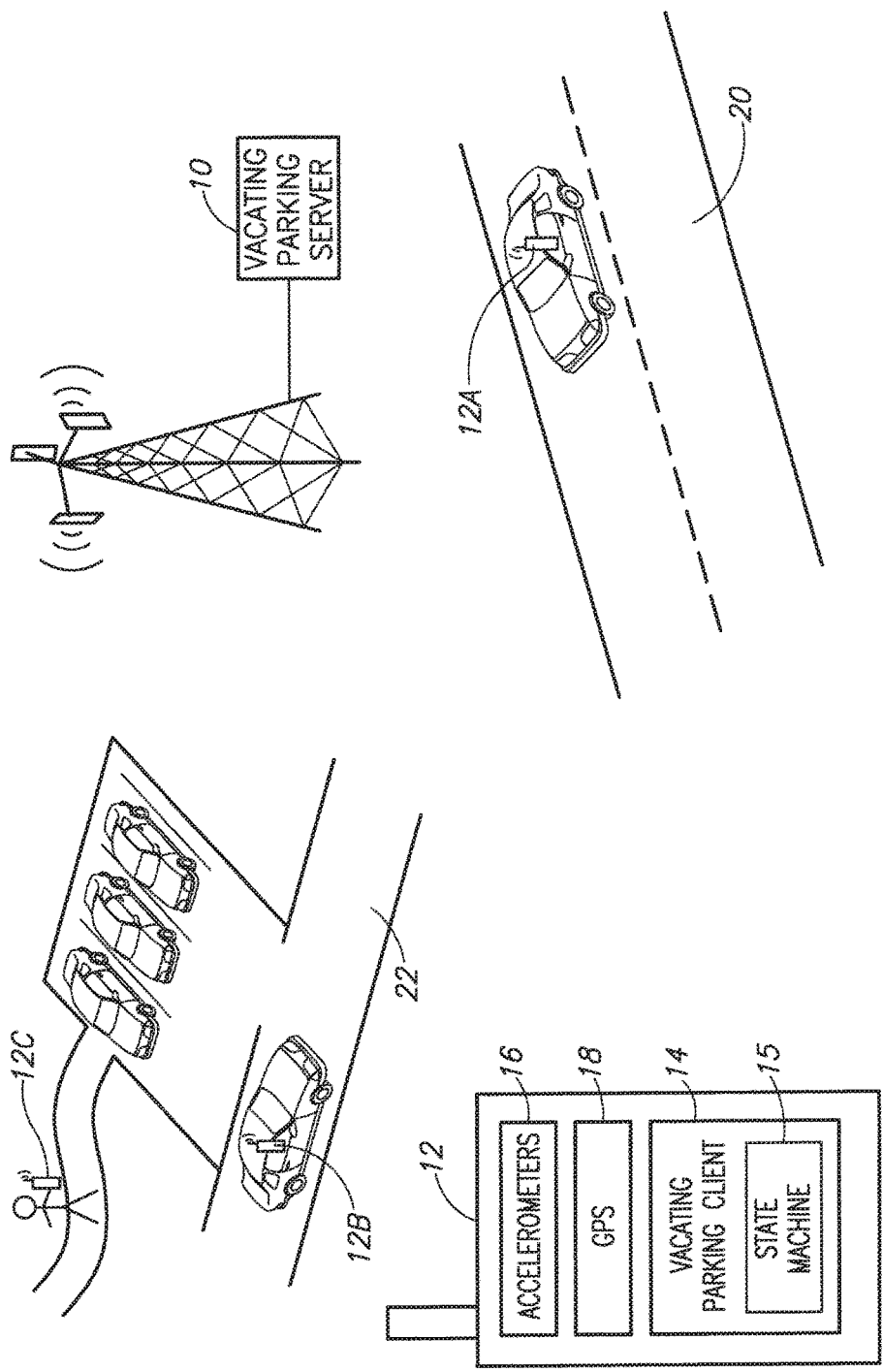
FIG. 1 is a schematic illustration of the operation of a parking client, constructed and operative in accordance with a preferred embodiment of the present invention.

Reference is now made to FIG. 1, which is a schematic illustration of a system for providing about to be vacated parking information to users having mobile devices. The system comprises a vacating parking server 10 receiving information from a plurality of mobile devices 12, each having a vacating parking client 14 and a plurality of motion sensors, such as at least one accelerometer 16 and a GPS (global positioning system) unit 18. Typically, motion sensors such as accelerometers 16 and GPS 18 may be standard features of mobile devices 12 whose output may be provided to their associated vacating parking client 14. Moreover, mobile devices 12 may communicate with each other and with server 10 via a mobile communication system 19, shown as a transmitting tower.

Mobile devices 12 typically move with the user. In accordance with a preferred embodiment of the present invention, the motion of the user may be determined from data from at least one accelerometer 16. Thus, if the user is in a car, for example, on a highway 20, the speed of the associated mobile device, such as device 12A, may be that of the car. However, if the car is on a side street, such as side street 22, the speed of the mobile device, such as mobile device 12B, may be significantly slower. If the mobile device is with the user as s/he walks either to or from the car, such as mobile device 12A, the speed may be even slower. Moreover, there is a point at which the device may come to a stop, after which the device may be carried by a user who is walking. This point may be the parking spot and the location of the parking spot, which, in accordance with the present invention may be provided by GPS 18, may be noted.

In accordance with a preferred embodiment of the present invention, vacating parking clients 14 may include a state machine 15 to determine the state of their associated mobile devices 12 and, accordingly, of their associated users, as their users move around. Clients 14 may transmit regular updates to vacating parking server 10, thereby enabling server 10 to determine which devices 12 are parked. When a client 14 may transmit an indication that its associated mobile device 12 may be moving back toward its parking location, server 10 may find clients 14 in the vicinity of the parking location, such as parking lot 24, and may update them that a parking spot may shortly become available.

In accordance with a preferred embodiment of the present invention, state machine 15 may utilize a motion sensor, such as at least one accelerometer 16, to track a motion state and may utilize a position sensor, such as GPS 18, to determine the parking location. With this arrangement, parking client 14 may utilize less battery power, as accelerometers 16 may be utilized only for motion sensing (without the significant overhead of calculating location) and GPS 18, which utilizes a significant amount of battery power, may be activated rarely, such as for the location measurement.

Figure 2:
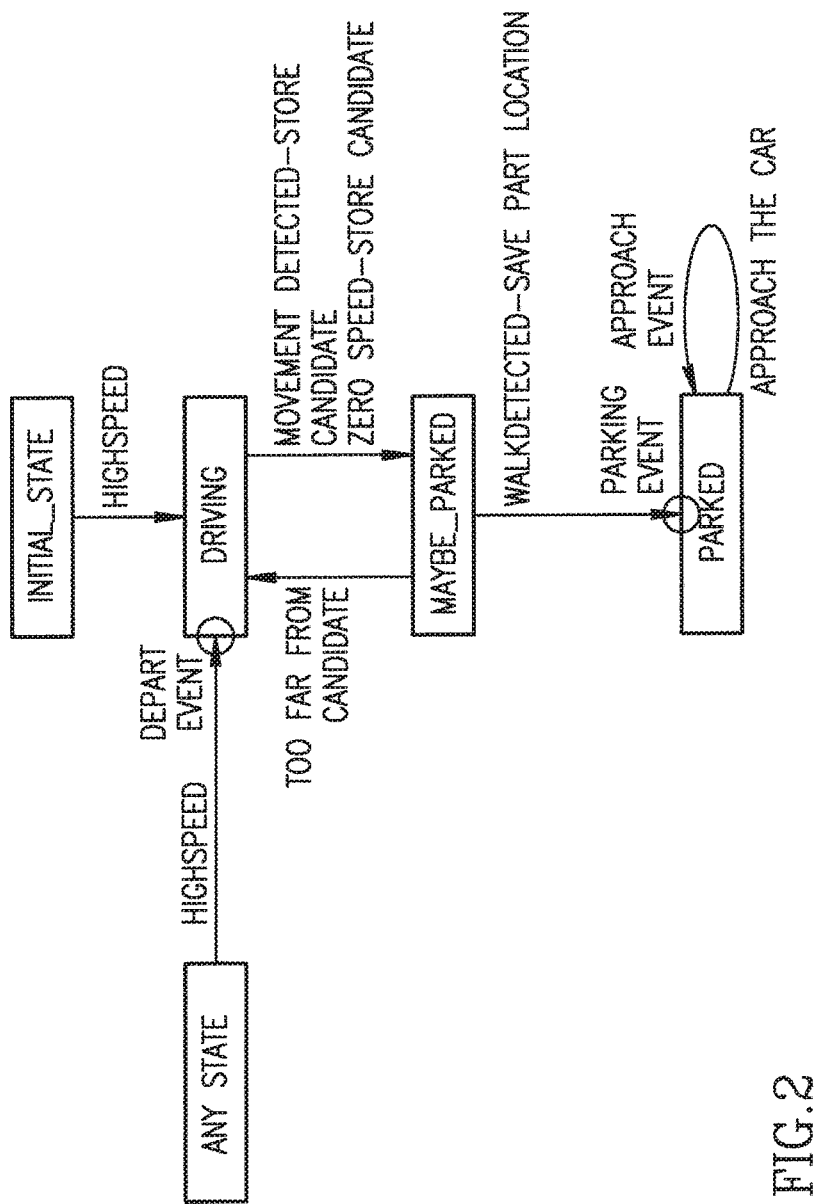
FIG. 2 is a state machine illustration of the operation of the parking client of FIG. 1.

Reference is now made to FIG. 2, which represents an overall state machine for the vacating parking client 14. Client 14 may have three major states, that of DRIVING, PARKED and MAYBE_PARKED. The following descriptions generally define the states:

INITIAL_STATE—the initial state
DRIVING—Car is moving.
MAYBE_PARKED—Car maybe parked.
PARKED—Car is parked.

Client 14 may change state as a function of whether walking, some other kind of movement, zero speed or high speed was detected. These motions may be detected as patterns of data from accelerometers 16, where high speed and walk have particular patterns of interest, described in more detail hereinbelow.

Client 14 may also change state as a function of distance from a possible parking state. In particular, if high speed was detected, from any state, client 14 may move to the DRIVING state. If, from the DRIVING state, a zero speed motion was detected, client 14 may move into the MAYBE_PARKED state and the parking location, from just before the walking may have started, may be received from GPS 18 and stored as a candidate parking location.

In an alternative embodiment, or in addition, client 14 may move into the MAYBE_PARKED state when the device is "picked up" by the user when leaving the vehicle. For example, this may be detected by observing a consistent and major change in the device's three-dimensional position, which may be provided by accelerometers 16 and/or gyroscopes or any other position sensing device.

If, from the MAYBE_PARKED state, a walking pattern was detected, client 14 may move into the PARKED state and the candidate parking location, received from GPS 18, may be stored as the actual parked location and may be reported to server 10.

Client 14 may confidently declare the PARKED state once the switch from driving to walking has been detected and may take the parking location as the location where walking began and/or the candidate location when the MAYBE_PARKED state was entered. The transition to "MAYBE_PARKED" event may help to ensure as accurate a parking location as possible. However, it may initially only be a "maybe" state as the vehicle may switch to it by mistake during driving but as soon as high speed may be detected, the state may be changed to "DRIVING".

While in the parked state, client 14 may track the distance, using GPS 18, from the parking location. When the distance is reducing and is close again to the parking location, client 14 may raise an approach event and may report the approach event to server 10. Parking server 10 may, in turn, transmit the parking location of the client 14 in the PARKING state to any clients 14 within a pre-determined proximity of the parking location which is about to be vacated.

Finally, if high speed is detected at any time, client 14 may transition back to the DRIVING state.

To detect any of the movement patterns, client 14 may generally continually process the signal from accelerometers 16 in real time, searching for either a driving pattern or a walking pattern. A driving pattern may be one of steady acceleration. Alternatively, a driving pattern may be detected if the device quickly changes base stations. The latter may utilize the cellular base station ID, received by the cellular phone elements of device 12 and may determine how quickly the base station ID changes.

Since low power sensors, such as accelerometers and the cellular phone elements, may determine speed but only with low accuracy, if desired, client 14 may activate a more accurate sensor, such as GPS 18, for a short time after a possible driving pattern may be detected, to finalize the decision of being in the DRIVING state. For example, client 14 may check if the speed of the device is above 20 km/hour.

A walking pattern may be the acceleration pattern caused by the fact that the device moves up and down on each walk step. An exemplary process that may be used by client 14 is described in U.S. patent application Ser. No. 13/980,924, entitled "Mobility Determination", now U.S. Pat. No. 9,933,450, the disclosure of which is incorporated herein by reference, to be filed concurrently herewith and assigned to the common assignee of the present application. Client 14 may utilize accelerometers 16 as a pedometer and may count the walk steps of the person carrying the device. Client 14 may count and validate the walk steps by matching the frequency of steps to a typical walking pace of a human being. There may be many other possible ways of using the device sensors to determine that a person is walking.

Moreover, the steps may alternatively be utilized to determine the parked location of the vehicle by counting the number of steps and by knowing the direction of motion. With this, client 14 may determine the point at which the walking started which it may also utilize to estimate the current distance from the vehicle.

In an alternative embodiment, a mobility state determiner, such as that described in the US Patent application entitled "Mobility Determination", may be utilized. The mobility state determiner described therein differentiates between a walking state and a driving state as a function of the variance of the accelerometer signal.

Figure 3:
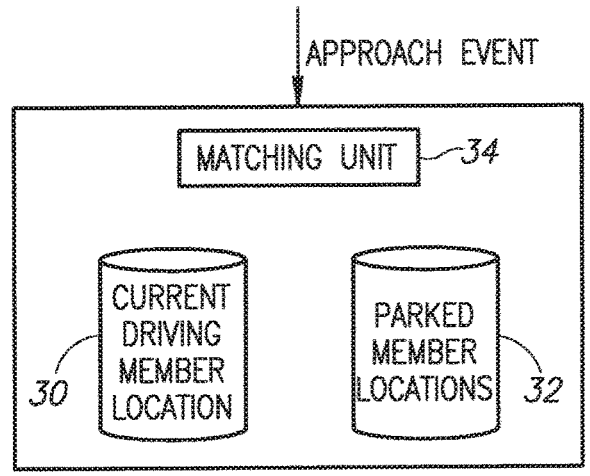
FIG. 3 is a schematic illustration of a parking server operative in conjunction with the parking client of FIG. 1.
Figure 4:
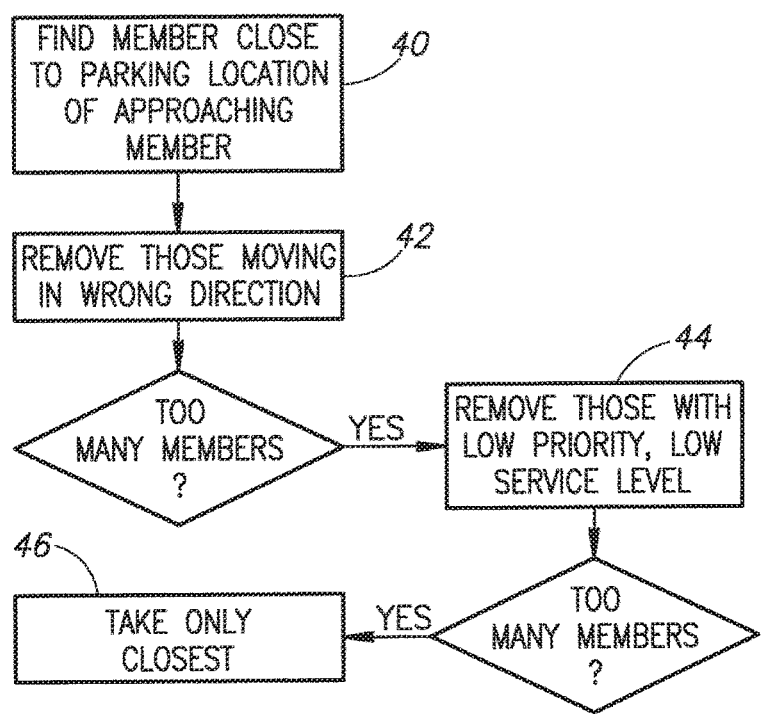
FIG. 4 is a flow chart illustration of the operation the parking server of FIG. 3.

Reference is now made to FIG. 3, which illustrates the elements of vacating parking server 10, and to FIG. 4 which illustrates an exemplary operation. Vacating parking server 10 may comprise a database 30 storing the locations of current driving members of the parking community (i.e. those users who have signed up for this service and are currently in a DRIVING state), a database 32 storing the parking locations of all members having a PARKED state and a matching unit 34 to find members close to a parking location when parking server 10 may receive an approach event for that parking location.

In step 40, matching unit 34 may search member location database 30 for all member locations within a predefined proximity to the parking location associated with the current approach event, where the predefined proximity may be, for example, within a 1 kilometer radius. The pre-defined proximity is variable that may have variety of values, based on the hour of the day, the day in the week, weekends, holidays, special events, geographical locations, etc.

Matching unit 34 may then attempt to remove members that are currently too far from the parking location and for which there is no chance of them arriving at the parking location within a reasonable amount of time. Matching unit 34 may also attempt to keep the number of members who will receive an "about to be vacated" parking location notification to a minimum, such as 1-3, to keep from having many members vying for the same parking spot.

In step 42, matching unit 34 may remove all those members moving in a direction away from the parking location or which, according to a reasonable path calculation, such as may be available from any mapping software, are unlikely to arrive at the parking location in less than a predefined length of time.

Matching unit 34 may check if there are too many members in its current list, where "too many" may be any predefined value, such as 3. If there are too many members, matching unit 34 may remove (step 44) those with a low priority or with a low service level (i.e. those that have not paid for a premium service)

Matching unit 34 may then check if there are still too many members in its current list and, if so, may transmit (step 46) the parking location of the parking spot which is about to be vacated only to the closest one or two in the list.

If desired, matching unit 34 may implement a reservation system. Unit 34 may indicate, not only the available parking spot, but also the user returning to the parking spot. Matching unit 34 may enable other users, such as those who are looking for a parking spot, to reserve a spot they see about to be vacated. If desired, matching unit 34 may enable the returning user to put his/her spot up for auction. The winning bidder may arrive at the parking spot and may pay the returning user, either with cash or with digital cash, such as by a telephone to telephone payment. The latter may be implemented by NFC, a payment system which identifies the nearby chip and authorizes payments therebetween.

On the parking client of the users receiving the 'about to be vacated' parking indication, the parking spaces about to be vacated may be presented on a map/in the form of a notification, or as an audible notification or in any other way. Users that receive the report and are in search of parking in the same area may use this data in order to get the parking space about to be vacant.

It will be appreciated that the ability to predict that a parking space is about to be vacated may provide a powerful automatic parking solution.

Server 10 may also comprise units which may report on the activity of parking spots over time. Data about parking spaces may be accumulated into a database together with additional attributes such as user ID, day and time. The accumulated data may be classified to elements such as parking lots and on-street parking. The information may be a function of time or day in a week, points of interest nearby and more.

It is possible to calculate the average parking availability over time for a specific area by comparing the number of cars vacating parking spaces in the given area to the number of cars parking in the same area. This estimation may be calculated as a function of time, day or season.

Using the above, server 10 may provide a search facility in which a user may list search results according to parking availability, for example, a user wishing to go to the movies may list the cinemas according to average parking availability in the last hour or the predicted parking availability at the time of the movie screening.

Another possible application is related to location based advertisements. Server 10 may utilize information that a specific user is looking for parking to display to the user effective advertisements of shopping places near the parking space.

The statistical parking spot data may be provided also for each user separately, according to their typical daily behavior. In this case, server 10 may include a unit to predict where the user is expected to park according to their daily behavior and may provide them with parking spot assistance accordingly. Similarly, server 10 may also identify available spots based on patterns of how its users park over time. For example, server 10 may look for users which park in the same neighborhood during weekdays and leave between 5:00 pm and 6:00 pm. Server 10 may utilize this information to predict which spots may become available.

Moreover, server 10 may include a unit which, upon receipt of an approach event, may send to the approaching client relevant notifications, such as alerts about possible traffic jams on their way home, availability of traps, traffic lights out of work etc.

On the client side, other units on device 12 may operate with client 14. For example, a calendar unit may know of an upcoming appointment and may have information regarding how long it may take to get to the appointment. The calendar unit may receive approach events and thus, may respond to a lack of an approach event by warning the user if s/he is about to miss an appointment. The calendar unit may also have a payment time for the parking meter and may remind the user that parking payment time is overdue if the approach event is not received by a predefined time.

Unless specifically stated otherwise, as apparent from the preceding discussions, it is appreciated that, throughout the specification, discussions utilizing terms such as "processing," "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk, including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EEPROMs), magnetic or optical cards, Flash memory, or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method implementable in a computing device, the method comprising:
obtaining an approach event, wherein the approach event is automatically generated based on sensor readings from a mobile device of a user, wherein the sensor readings are indicative of the user heading back towards a parking location of a car of the user; and
transmitting to a second mobile device of a second user an indication indicating that the car is estimated to vacate the parking spot, wherein said transmitting is performed prior to the car vacating the parking spot.

2. The method of claim 1, wherein the approach event is generated based on a mobility status determined using a motion sensor of the first mobile device.

3. The method of claim 1, wherein the sensor readings are accelerometer readings which are indicative of a walking mobility state.

4. The method of claim 1, wherein the sensor readings indicate a reduction in a distance between a location of the mobile device and the parking location.

5. The method of claim 1, wherein the approach event is generated in response to an automatic estimation that the user is potentially approaching the parking location.

6. The method of claim 1, wherein the approach event is generated after an automatic detection of the car being parked in the parking location, wherein the automatic detection of the car being parked is based on sensor readings from the mobile device.

7. The method of claim 6, wherein the automatic detection is based on a mobility status determination derived from accelerometer readings of an accelerometer comprised by the mobile device, wherein the mobility status determination indicates either a walking mobility status or a driving mobility status.

8. The method of claim 7, wherein in response to a change between a driving mobility status to a potentially walking mobility status, obtaining, using a location sensor of the mobile device, a location; and wherein in response to a determination that the car was parked, using the location as the parking location.

9. The method of claim 1 further comprises: finding members of a community that are driving in an area in proximity to the parking location, wherein the second user is comprises by the members.

10. The method of claim 9 further comprises in response to a determination that a number of members found in said finding is above a threshold, removing a portion of the members to obtain a reduced list of members, wherein the reduced list of members comprises a number of members not exceeding the threshold.

11. The method of claim 10, wherein said removing is based on a service level associated with each member of the members.

12. The method of claim 10, wherein said removing is based on a direction of driving of each member of the members.

13. The method of claim 10, wherein said removing is based on an estimated driving time of each member from a current location thereof to the parking location, wherein the estimated driving time is determined based on a path computation from a current location of the member to the parking location.

14. A computer program product comprising a non-transitory computer readable storage medium retaining program instructions, which program instructions when read by a processor, cause the processor to automatically generate an approach event, wherein the approach event is generated automatically based on sensor readings from a mobile device of a user, wherein the sensor readings are indicative of a user heading back towards a parking location of a car of the user, wherein based on the approach event one or more indications are transmitted to mobile devices of other users, wherein the one or more indications indicate that the car is estimated to vacate the parking spot, wherein said transmitting is performed prior to the car vacating the parking spot.

15. The computer program product of claim 14, wherein the computer readable product is loaded on to the mobile device, wherein the mobile device comprising a motion sensor and a location sensor.

16. The computer program product of claim 14, wherein the computer readable product is loaded on to a server connectable to the mobile device.

17. The computer program product of claim 14, wherein the program instructions are configured to cause the processor to transmit the approach event to a server, wherein the server is configured to transmit the one or more indications.

18. The computer program product of claim 14, wherein the program instructions are configured to cause the processor to obtain the sensor readings from the mobile device; and to transmit the one or more indications.

19. The computer program product of claim 14, wherein the approach event is generated in response to an automatic estimation that the user is potentially approaching the parking location.

20. The computer program product of claim 14, wherein the sensor readings indicate a reduction in a distance between a location of the mobile device and the parking location, wherein the program instructions are configured to cause the processor to generate the approach event in response to identifying the reduction in the distance between the location of the mobile device and the parking location.

21. The computer program product of claim 14, wherein the approach event is generated based on a mobility status determined using a motion sensor of the mobile device.

22. The computer program product of claim 14, wherein the sensor readings are accelerometer readings which are indicative of a walking mobility state.

23. The computer program product of claim 14, wherein the sensor readings indicate a reduction in a distance between a location of the mobile device and the parking location.

24. The computer program product of claim 14, wherein the approach. event is generated in response to an automatic estimation that the user is potentially approaching the parking location.

25. The computer program product of claim 14, wherein the approach event is generated after an automatic detection of the car being parked in the parking location, wherein the automatic detection of the car being parked is based on sensor readings from the mobile device.

26. The computer program product of claim 25, wherein the automatic detection is based on a mobility status determination derived from accelerometer readings of an accelerometer comprised by the mobile device, wherein the mobility status determination indicates a walking mobility status or a driving mobility status.

27. The computer program product of claim 14, wherein the program instructions when read by a processor, cause the processor to find members of a community that are driving in an area in proximity to the parking location, wherein the members comprise the other users.

* * * * *